Figure 1:
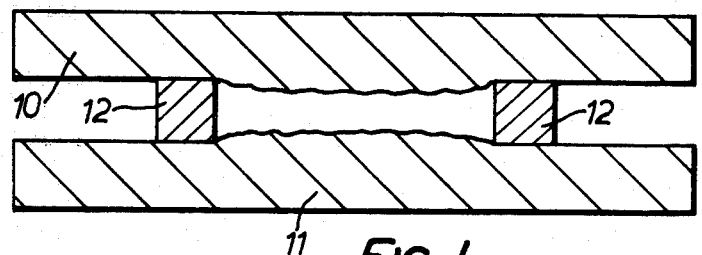

United States Patent [19]

Pryce-Jones

[11] 4,048,273
[45] Sept. 13, 1977

[54] METHOD OF MAKING A STRUCTURAL ELEMENT

[75] Inventor: Alan Pryce-Jones, Cheltenham, England

[73] Assignee: Jeremy Bruce Holt, Cheltenham, England; a part interest

[21] Appl. No.: 623,650

[22] Filed: Oct. 17, 1975

[51] Int. Cl.$^2$ .............................................. B29D 27/00
[52] U.S. Cl. .................................... 264/46.5; 29/460; 52/309.4; 52/309.11; 264/46.7; 264/263
[58] Field of Search ................ 29/460; 264/46.5, 46.7, 264/45.6, 259, 267, 263, DIG. 83; 52/309.4, 309.11

[56] References Cited

U.S. PATENT DOCUMENTS

| 1,951,132 | 3/1934 | Cox | 264/259 X |
| 2,005,719 | 6/1935 | Hayden | 264/267 X |
| 2,924,861 | 2/1960 | Viets | 264/46.5 X |
| 3,153,697 | 10/1964 | Faulkner | 264/267 X |
| 3,546,841 | 12/1970 | Smith et al. | 264/46.5 X |

*Primary Examiner*—Charlie T. Moon
*Attorney, Agent, or Firm*—Young & Thompson

[57] ABSTRACT

In the production of a structural element such as a door or a panel forming part of the surround of a swimming pool, a rigid framework is placed on an upwardly presented surface of a mould. The mould is then closed and a foamed plastics material is injected into the mould cavity part of the periphery of which is defined by the framework which becomes an integral part of the moulded product.

3 Claims, 4 Drawing Figures

4,048,273

METHOD OF MAKING A STRUCTURAL ELEMENT

This invention relates to structural elements and is concerned with the provision of improvements in the manufacture of structural elements, having particular application to the manufacture of doors which have an aluminium surround.

According to the invention there is provided a method of making a structural element which comprises disposing a metal or plastics framework in engagement with a mould element so that the framework defines the periphery of a mould cavity and thereafter injecting foamed plastics material into said mould cavity so as to form a structural element which comprises foamed plastics material bonded to and surrounded by the metal or plastics framework.

A light-weight structure is thus obtained whilst, at the same time, the structural element is resistant to impacts applied to the periphery thereof. By appropriate design of the mould surface, a variety of contours can be provided. If a plastics framework is used, the plastics material will be rigid and may be rigid polyvinyl chloride.

An advantage of placing the metal or plastics framework in engagement with a mould element is that this permits the use of a single mould element in the production of a number of different sizes of structural element. Thus the size of the finished article is determined by the size of the metal or plastics framework and, in order to avoid feeding problems, the feeding of the foamed plastics material is effected through apertures formed in the framework, foaming being controlled by selective closing of bleed holes leading from the mould cavity, the bleed holes also being formed in the metal or plastics framework. Volumetric control can also be effected.

The arrangement may be such that the metal or plastics framework is disposed between a pair of mould elements and casting of the foamed plastics material is effected in a single operation. Although this method of manufacture has advantages in that it enables repetitive and continuous production to be maintained, a number of other advantages are obtained by the use of a method which involves the use of only one mould element. In such instance a panel, preferably of fire-resistant or -retardant material, is located within the framework and is appropriately secured thereto so that it is situated midway between the planar end faces of the framework. Hinges and a lock mechanism attached to the framework can be secured to this panel. Moulding is then carried as a two-stage process with the framework and panel resting on a mould element and foamed plastics material injected in a controlled manner into the space beneath the panel and surrounded by the framework. After completion of one facing of the door or other structural element, the framework is turned over and foamed plastics material again injected into the mould cavity defined beneath the panel.

Figure 2:
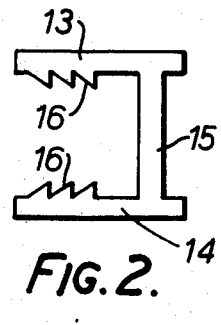
Figure 3:
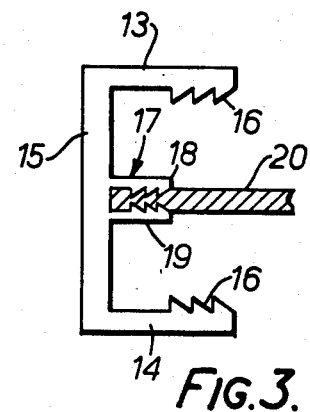
Figure 4:
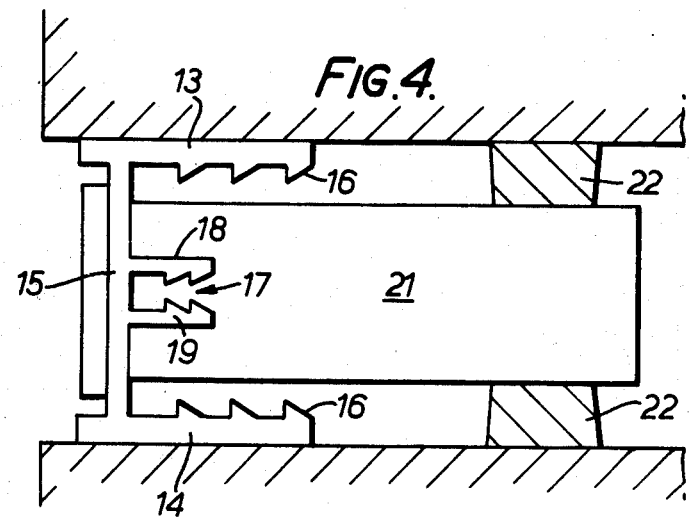

The invention will now be described by way of example with reference to the accompanying drawings in which:

FIG. 1 is a sectional view of a mould comprising two mould elements and a rigid framework between the mould elements, the framework being illustrated diagrammatically, FIG. 2 is a cross-sectional view of a member of the framework, FIG. 3 is a cross-sectional view of an alternative form of frame member, and FIG. 4 is a detail view showing the positioning of a lock mechanism between a pair of mould elements during the manufacture of a door.

FIG. 1 shows apparatus comprising upper and lower mould elements 10 and 11 and a framework consisting of rigid frame members 12 which cooperate with the inwardly facing surfaces of the mould elements to define the mould cavity. Although each frame member 12 is shown in FIG. 1 as comprising a solid rectangular cross-section element, a more specific construction is shown in FIG. 2. The frame member shown in FIG. 2 is an extruded aluminum section which includes a pair of parallel limbs 13 and 14 interconnected by a base 15, the inner faces of the two limbs being provided with integral sawtooth formations 16. Plastics frame members may alternatively be employed.

In use, four extruded sections of the configuration shown in FIG. 2 are positioned so as to define the framework of the door with the limbs 13 and 14 thereof directed inwardly. A feed hole and a number of bleed holes (not shown) are formed in the bases 15 of the sections and injection of a foamed plastics material, which is preferably a polyurethane, is then effected from a suitable foam dispensing machine in a manner well-known to those versed in the art of producing foamed plastics mouldings. The sawtooth formations 16 constitute keying formations which become embedded in the foamed plastics material and greatly improve the bond which is obtained between the extruded aluminum sections and the foamed plastics material in the finished door or other structural element.

The alternative form of frame member shown in FIGS. 3 and 4 again includes spaced, parallel limbs 13 and 14 interconnected by a base 15 with sawtooth formations 16 on the inner faces of the limbs 13 and 14 but, in this instance, a channel-section formation 17 is provided between the two limbs 13 and 14. The formation 17 comprises a pair of spaced, parallel limbs 18 and 19 with sawtooth keying formations on the inner faces of the limbs 18 and 19. The formations 17 of the four members of a framework cooperate to form a frame to receive the edges of a panel 20 of asbestos or other fireresistant or fire-retardant material. Steel hinges (not shown) for mounting the door can be secured to the panel 20 and, in order to improve the fire-resistant properties of the door, the polyurethane which is employed is preferably of a flame-retardant nature.

A lock structure 21 is attached to the appropriate frame member and carries a pair of pressure pads 22 which abut the adjacent surfaces of the mould elements and define keyhole apertures in the door. The mould elements which define the presented surfaces of the door may be planar or may include formations designed to produce any desired ornamentation for the door.

The method of production may be such that, when a panel 20 is employed, the foamed plastics material is injected only into the space on one side of the panel, i.e. only one mould element is used and one facing of the door is produced. The framework and said one formed facing are then turned over so that a mould cavity is again defined beneath the panel 20. Foamed plastics material is injected into this cavity and production of the door is thus completed.

In the process described above, the outer metal framework is the only frame contained in the mould. However, if it is desired that the door should be glazed, one or more aluminium glazing frames will be positioned in the mould prior to injection of the foamed plastics material.

What I claim is:

1. A method of making a structural element which includes:
   a. providing a mould element,
   b. providing a plurality of frame members including spaced parallel limbs the inner faces of which are provided with keying formations,
   c. assembling the frame members to form a framework in engagement with the mould element so that the framework cooperates with the mould element to define the periphery of a mould cavity, and
   d. injecting foamed plastics material into said mould cavity so as to form a structural element which comprises foamed plastics material surrounded by the framework and mechanically interlocked with the keying formations on the inner faces of the frame members.

2. A method according to claim 1, wherein the framework is disposed between a pair of mould elements.

3. A method according to claim 1, wherein the framework is formed from extruded aluminum sections and the foamed plastics material is foamed polyurethane.

* * * * *